Patented Aug. 19, 1947

2,426,017

UNITED STATES PATENT OFFICE 2,426,017

PROCESS FOR PREPARING 1,3-BUTYLENE GLYCOL

Clement H. Hamblet, Gordon Heights, and Ambrose McAlevy, Wilmington, Del., assignors to E. I. du Pont de Nemours & Company, Wilmington, Del., a corporation of Delaware No Drawing. Application October 8, 1943, Serial No. 505,580

2 Claims. (Cl. 260—635)

This invention relates to a process for condensing olefins with formaldehyde, and particularly to a process for condensing the lower olefins with aqueous formaldehyde in the presence of catalysts.

The reaction between the lower olefins and formaldehyde in the presence of acetic acid and sulfuric acid to give 1,3-alkandiol esters was disclosed in French Patent 717,712. Certain more highly reactive unsaturated compounds including styrene, anethole and isosafrole were known to yield, in the presence of acetic and sulfuric acids, not only the 1,3-alkandiol esters, but substituted 1,3-alkandiol cyclic formals as well (Prins. Chem. Weekblad 16, 1510-26 (1919)). In British Patent 483,828 it was disclosed for the first time that cyclic formals could be produced from the lower olefines and formaldehyde, the reaction yielding, in the case of propylene and formaldehyde, 1,3-butylene glycol cyclic formal, as follows

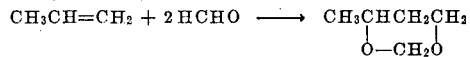

A suitable catalyst for this reaction was described in U. S. Patent 2,135,454.

Several attempts have been made to improve the synthesis of 1,3-butylene glycol cyclic formal, and its hydrolysis product 1,3-butylene glycol, from propylene and formaldehyde. In place of the hydrated boron fluoride catalysts which were employed for this reaction according to British Patent 483,828 (also U. S. Patents 2,158,031 and 2,289,548 and the copending application S. N. 429,514 of D. J. Loder, filed February 4, 1942), other condensation catalysts including aqueous sulfuric acid, hydrochloric acid, phosphoric acid, and zinc chloride were tried, as noted in U. S. Patent 2,218,640. With these condensation catalysts the yields were low and the time required for reaction was so long as to preclude commercial operation of the process. Thus, when hydrochloric acid catalyst was used, as mentioned in U. S. Patent 2,143,370, a reaction time of 5 hours was employed and a product contaminated with chloro-3-butanol-1 was obtained. Quite recently it was proposed that 1,3-alkandiols could be made by hydrolysis of 1,3-alkandiol cyclic formals under pressure, but the hydrolysis proved to be an extremely slow reaction and the process required, in the case of propylene, a prohibitively long reaction time of 24 hours (U. S. Patent 2,307,894).

An object of the present invention is to provide an improved process for condensation of olefins with formaldehyde. Another object is to provide an industrially feasible process for the synthesis of 1,3-butylene glycol. A further object is to provide a process whereby very high yields of 1,3-butylene glycol are obtained in a comparatively short reaction time, from propylene and formaldehyde.

These and other objects are accomplished by condensing olefins with formaldehyde in the presence of aqueous condensation catalysts at high pressure, and under certain other conditions of reaction to be hereinafter described. In accordance with this invention the reaction between olefins and formaldehyde may be directed either to the formation of 1,3-alkandiols or to the formation of 1,3-alkandiol cyclic formals. This invention involves the discovery that excellent yields of 1,3-alkandiols can be obtained in relatively short reaction times by condensation of water and formaldehyde with olefines, particularly at high pressures, and that the condensation can also be controlled to give excellent yields of 1,3-alkandiol cyclic formals when these are the desired products. The invention also involves the discovery that 1,3-alkandiol cyclic formals, when present initially in the water-formaldehyde-olefine condensation mixture have a pronounced effect in increasing the yield of 1,3-alkandiols from the water olefine and formaldehyde, the net result of these effects being that yields of 1,3-alkandiols exceeding 80% are obtained from olefine and aqueous formaldehyde in a reaction time of about 20 to 60 minutes. Despite the known effect of high pressures in increasing the rate of olefine polymerization, it is remarkable that the reaction between olefins and formaldehyde can be conducted at very high pressure without the formation of olefin polymers. This is particularly surprising in the case of propylene, which, it is now found, reacts with aqueous formaldehyde at pressures exceeding 650 atmospheres without the formation of propylene polymers.

While the reaction between aqueous formaldehyde and olefins is evidently a general one for all olefins, the effect of high pressure is most pronounced with olefins containing from two to four carbon atoms. Of these, propylene is especially well adapted, although the butylenes and ethylene also react quite well. Hitherto it has been difficult or impossible to obtain 1,3-alkandiol derivatives by condensation of ethylene with formaldehyde, but by the method of the present invention ethylene reacts with aqueous formaldehyde very readily at 500 to 900 atmospheres pressure although the yields of 1,3-alkandiol and 1,3- alkandiol cyclic formal are not as high as in the propylene-formaldehyde condensation.

The catalysts which are employed as condensing agents in accordance with this invention are aqueous acid-reacting substances including hydrated boron fluoride, sulfuric acid, methyl formate, formic acid, acidic clay-like materials such as "Super Filtrol" either in the form of pellets or as aqueous dispersion of the powder, phosphoric acid, calcium sulfate or the like. The solid catalysts may remain fixed during the reaction or may be agitated or moved through the reaction mixture. It is not necessary that a strong mineral acid be present. When dilute mineral acids are used, the concentration should be about 0.5 to 15% of the water present.

The pressures used in accordance with this invention are from 75 to 2000 atmospheres, preferably at least 400 atmospheres. Good results are obtained at 400 to 1000 atmospheres. Temperatures may be from 30° to 250° C., preferably 100° to 200° C. When the reactants are propylene and formaldehyde, excellent results are obtained at 150° to 175° C.

The relative proportion of 1,3-alkandiol and 1,3-alkandiol cyclic formal produced from olefin and formaldehyde, especially when no 1,3-alkandiol formal is introduced initially, depends largely upon the ratio of water to formaldehyde in the initial reactants. Thus if equimolal amounts of water (containing 5% H₂SO₄) and formaldehyde are processed with propylene at high pressure, the cyclic formal and small amounts of linear formals are produced to the almost complete exclusion of 1,3-butylene glycol, but if the ratio of water to formaldehyde is as high as 8 to 1, the amount of 1,3-butylene glycol in the product is nearly 6 times the amount of cyclic and linear formals. Higher proportions of water to formaldehyde may be used, but there is little or no yield advantage in using more than about 15 moles of water per mole of formaldehyde.

When, for each mole of formaldehyde, 0.1 to 0.4 moles of cyclic formal (a part of which may be substituted by an equivalent quantity of the linear formal) is included in the initial reaction mixture (molal ratio of water to formaldehyde being between 3:1 and 10:1 preferably between 5:1 and 10:1), and the condensation is conducted under conditions of temperature and pressure within the preferred range noted above, the amount of formals in the reaction product is nearly the same as the amount of formals charged. A suitable catalyst in such a process is sulfuric acid of 0.5 to 2.0% concentration. The formals can be recovered from the product and can be reused in a similar subsequent cycle. Under these conditions, propylene and aqueous formaldehyde react to give 70–85% yield (based on HCHO) of 1,3-butylene glycol, and a reaction time of only about one hour, or even less, is sufficient. Extending the reaction time to 2 or 3 hours raises the yield of 1,3-alkandiol only slightly. The discharged product may be neutralized with a base, suitably a base which converts the sulfuric acid to an insoluble salt which can be removed by settling or filtration. The neutral product may be distilled to yield as the main fractions: (1) isopropanol-water, (2) cyclic formal-water, (3) water, (4) linear formals, (5) 1,3-alkandiol, (6) mixture of linear formals and unidentified high-boiling by-products.

The improved results which are obtained when formals are introduced with the initial reactants may be due to several contributing causes. One may assume that an equilibrium mixture of formals and 1,3-alkandiol would normally be produced from the olefine, water and formaldehyde, and that initial addition of formals results in a mass action effect which causes the aqueous formaldehyde and olefine to form 1,3-alkandiol. Also, the formals probably cause increased solubility of propylene in the reaction mixture. These theories, however, are not intended to restrict the invention in any way. Whatever the explanation, the initially added formals for all practical purposes act very much like catalysts, because by their mere presence they cause a marked increase in rate of formation and yield of 1,3-alkandiol from the olefin and formaldehyde.

This invention is illustrated further by the following examples without being limited thereto.

*Example 1.*—A mixture containing 30 grams of trioxymethylene, 100 grams of water, 2.3 grams of sulfuric acid, and 24.5 grams of 1,3-butylene glycol cyclic formal is charged into a stainless steel shaker tube, and the mixture is agitated for 60 minutes at 165° C. under 600 to 700 atmospheres of propylene pressure. The product is cooled and removed from the reactor and is thereafter treated with a slurry made from 1.4 grams of calcium oxide in water. The resulting neutralized product is filtered by means of a Gooch filter using charcoal as filter aid. Distillation of the filtrate gives a fraction boiling at 79° to 84° C. containing 0.5 gram of isopropanol as water azeotrope. The next cut boils at 84–95° C. and contains 25 grams of butylene glycol cyclic formal as water-azeotrope (chiefly heterogeneous azeotrope which boils at 88 to 89° C.). Following this the remaining water is distilled at 100° C. There remains a syrupy residue which, on distillation at diminished pressure, yields 80 grams of 1,3-butylene glycol which boils at 120° to 125° C. at 30 mm.

*Example 2.*—A mixture containing 30 grams of trioxymethylene, 18 grams of water and 0.95 gram of sulfuric acid is agitated in an autoclave at 150° for 20 minutes under a pressure of 200 atmospheres of propylene. The product is extracted with an equal volume of chloroform several times to obtain a water free solution of cyclic formal. This extract is diluted, yielding 67.3 grams of 1,3-butylene glycol cyclic formal, which has a boiling point of 114° C. The aqueous product, which does not dissolve in the chloroform, is neutralized with sodium hydroxide, and yields upon distillation, 11.3 grams of high-boiling water-soluble product, chiefly linear formals of 1,3-butylene glycol and a very small amount of 1,3-butylene glycol.

*Example 3.*—A mixture containing 34.5 grams of trioxymethylene, and 144 grams of a 13.4% aqueous solution of sulfuric acid is heated in a shaker tube for 2 hours at 190° C. under an ethylene pressure of 900 atmospheres. The liquid product after being withdrawn from the reactor is neutralized and extracted several times with chloroform. Distillation of the combined chloroform extracts gives 7.0 grams of trimethylene glycol cyclic formal, boiling at 105° C. The aqueous product, on neutralization and distillation gives 8.4 grams of trimethylene glycol, which has a boiling point of 214° C.

The reaction between the lower olefins and formaldehyde may be carried out in accordance with this invention in any suitable pressure resistant vessel made of or lined with materials which are not readily corroded by the acidic reaction mixtures. Such materials include stainless steel, mild steel, copper, silver, nickel, enamel glass and the like. Agitation may be provided, suitably by means of shaking machines or stirrers. The process may be conducted batchwise or continuously. In the continuous process the olefin may be introduced at one point or at several points within the reactor. In continuous operation the reactants may be pumped through a long narrow reactor, and the reaction rate can be increased by operating under conditions of turbulent flow. If desired, mixtures of various gaseous olefins instead of pure olefins may be employed, in which case the more reactive gaseous olefins condense with formaldehyde more or less selectively.

The formaldehyde used in accordance with this invention may be in the form of ordinary formalin, or it may be introduced as monomer or any of the polymeric forms such as paraformaldehyde, trioxane and the like.

We claim:

1. A process for preparing 1,3-butylene glycol which comprises heating aqueous formaldehyde, containing 3 to 10 moles of water per mole of formaldehyde, in the presence of sulfuric acid in quantity equal to 0.5 to 15% of the amount of water initially present, and 0.1 to 0.4 moles of 1,3-butylene glycol formal per mole of formaldehyde initially present, with propylene for about 20 to 60 minutes at a temperature of about 100° to 200° C. under 400 to 1000 atmospheres pressure thereby converting the aqueous formaldehyde and propylene to an aqueous solution of 1,3-butylene glycol without substantially altering the amount of 1,3-butylene glycol formal in the reaction mixture, and thereafter separating 1,3-butylene glycol from the resulting mixture.

2. A process for preparing 1,3-butylene glycol which comprises heating to 150° to 175° C. in a pressure resistant autoclave a mixture consisting of 5 to 10 molal equivalents of water, 1 molal equivalent of formaldehyde, 0.1 to 0.4 molal equivalent of 1,3-butylene glycol cyclic formal and sulfuric acid equal to 0.5 to 2.0% of the amount of water initially present subjecting the said mixture to the action of propylene at 600 to 1000 atmospheres pressure for 20 to 60 minutes, cooling and withdrawing the liquid product from the reaction mixture, removing the sulfuric acid from the said liquid by converting it to an insoluble salt, distilling the neutral liquid product to obtain a fraction containing butylene glycol cyclic formal-water azeotrope, said azeotrope containing an amount of 1,3-butylene glycol cyclic formal not substantially different from the amount of 1,3-butylene glycol cyclic formal charged, and another fraction containing 1,3-butylene glycol.

CLEMENT H. HAMBLET.
AMBROSE McALEVY.

REFERENCES CITED

The following references are of record in the file of this patent:

UNITED STATES PATENTS

| Number | Name | Date |
| --- | --- | --- |
| 2,307,894 | Mikeska | Jan. 12, 1943 |
| 2,325,760 | Fitzky | Aug. 3, 1943 |
| 2,143,370 | Fitzky | Jan. 10, 1939 |
| 2,289,548 | Loder | July 14, 1942 |
| 2,312,743 | Arundale et al. | Mar. 2, 1943 |
| 2,241,777 | Friedricksen | May 13, 1941 |

FOREIGN PATENTS

| Number | Country | Date |
| --- | --- | --- |
| 507,571 | Great Britain | June 14, 1939 |